Figure 1:
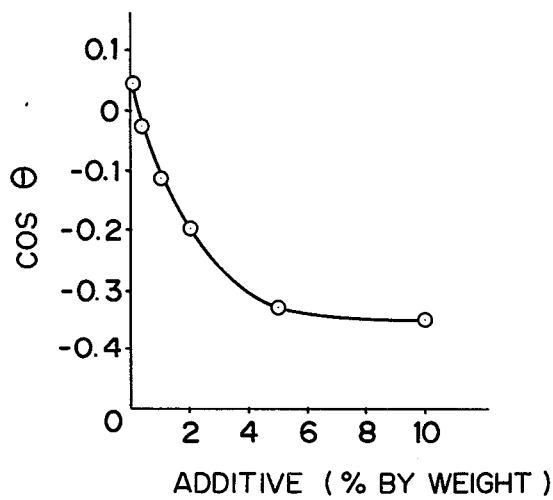

United States Patent [19]

Abe et al.

[11] 4,103,071
[45] Jul. 25, 1978

[54] THERMOPLASTIC RECORDING MEMBERS CONTAINING SILICONE OIL, FLUOROCARBON OIL OR CHLOROFLUOROCARBON OIL HAVING IMPROVED DEFORMATION PROPERTIES OF SURFACE

[75] Inventors: Michiharu Abe, Kawasaki; Akiyoshi Oride, Tokyo, both of Japan

[73] Assignee: Ricoh Co., Ltd., Tokyo, Japan

[21] Appl. No.: 674,372

[22] Filed: Apr. 7, 1976

[30] Foreign Application Priority Data

Apr. 11, 1975 [JP] Japan .................................. 50-43426

[51] Int. Cl.² .......................... G03G 16/00; G03C 5/04; B32B 27/00
[52] U.S. Cl. ............................................. 428/421; 96/1.1; 96/27 H; 260/29.1 SB; 260/33.8 UA; 428/447; 428/497; 428/500
[58] Field of Search ............... 260/29.1 SB, 100, 103, 260/33.8 R, 33.8 UA; 96/1.1, 27 H

[56] References Cited

U.S. PATENT DOCUMENTS

| | | | |
|---|---|---|---|
| 2,654,681 | 1/1950 | Lueck | 260/29.1 SB |
| 2,792,309 | 5/1957 | Teichmann | 260/37 SB |
| 3,317,315 | 5/1967 | Nicoll et al. | 96/1.1 |
| 3,413,146 | 11/1968 | Anderson, Jr. et al. | 96/1.1 |
| 3,873,355 | 3/1975 | Queener et al. | 428/421 |
| 3,970,769 | 7/1976 | Kato et al. | 260/884 |
| 4,018,603 | 4/1977 | Sheridan et al. | 96/1.1 |

OTHER PUBLICATIONS

Tappi, Paper Trade Journal, Jul. 17, 1941, pp. 40–42.

Primary Examiner—Joseph L. Schofer
Assistant Examiner—Peter F. Kulkosky, Jr.
Attorney, Agent, or Firm—Cooper, Dunham, Clark, Griffin & Moran

[57] ABSTRACT

Thermoplastic recording member in which a thermoplastic film recording layer is formed on a conductive support with the optional provision of an intermediate photoconductive layer, the resin film containing from 0.1 to 10% by weight of a silicone, fluorocarbon or chlorofluorocarbon oil, based on the weight of the film.

4 Claims, 3 Drawing Figures

THERMOPLASTIC RECORDING MEMBERS CONTAINING SILICONE OIL, FLUOROCARBON OIL OR CHLOROFLUOROCARBON OIL HAVING IMPROVED DEFORMATION PROPERTIES OF SURFACE

BACKGROUND OF THE INVENTION

Thermoplastic recording members are recording, or imaging members having a recording layer comprising a thermoplastic resin film in which an electrostatic pattern may be formed by the use of an electron beam, an electrostatic recording electrode, transferring of an electrostatic pattern or other electrophotographic processes. The recording layer is formed on an electrically conductive support or a photoconductive support. These thermoplastic recording members are used in recording or imaging systems including the step of imagewise wrinkling by forming frost or relief wrinkles on their surface. The wrinkles are produced by forming an electrostatic pattern on a surface of the recording layer and then softening the recording layer by means of heating or by exposing to solvent vapor.

Relief wrinkling produces a ridge-like wrinkle in the deformable layer at the boundaries or edges of charge no-charge locations, (lines of high potential gradient in the applied charge pattern) and is thus most suitable for the reproduction of high contrast subjects such as line copy or the outlines of solid area subjects. See for examples of relief wrinkling Glenn, Jr. U.S. Pat. No. 3,113,179; Norton U.S. Pat. No. 2,985,866; Dreyfoos, Jr., et al. U.S. Pat. No. 3,055,006; Boldebuck U.S. Pat. No. 3,063,872 and Cusano et al. U.S. Pat. No. 3,095,324.

Frost wrinkling produces a series of very small surface wrinkles over an entire charge area giving the image a frosted appearance with the frosted areas highly light scattering and appearing as dark portions on an imaging screen, in ordinary projection. Frost wrinkling is noted for its ability to produce high quality continuous tone as well as line copy images. For examples of frost wrinkling see Gunther et al. U.S. Pat. No. 3,196,011, Mihajlov et al. U.S. Pat. No. 3,196,008, and Gundlach and Claus. A Cyclic Xerographic Method Based on Frost Deformation, Phot. Sci. & Eng. 7.1 pp. 14–19 (1963).

In the thermoplastic recording members, the formation of the relief wrinkles or the frost wrinkles depends on the particular thermoplastic resin selected and its thickness. If the thermoplastic resin is easily deformable, fine and deep wrinkles may be formed by even a low charge density of the surface, so that records having high resolution and contrast may be obtained. Improvements in the deformation properties of the surface of the thermoplastic resin recording layer has been disclosed. For example, Japanese patent publication No. 19044/1968 describes a process of forming an overlayer having a softening point higher than that of inner layer so as to improve the deformation properties of the surface. The process requires actinic irradiation.

It has now been discovered in accordance with this invention that the deformation properties of the recording layer surface can be improved by using a recording layer of thermoplastic resin containing defined quantities of at least one selected silicone, fluorocarbon or chlorofluorocarbon oil.

SUMMARY OF THE INVENTION

The present invention relates to thermoplastic recording members for use in recording information by deformation of a surface of a recording layer comprising a thermoplastic resin film. More particularly, it relates to thermoplastic recording members having improved deformation properties of the surface of the recording layer.

The thermoplastic recording members of this invention are characterized by the presence of a recording layer comprising thermoplastic resin containing from 0.1 to 10% by weight of at least one silicone, fluorocarbon or chlorofluorocarbon oil as an additive based on the weight of the thermoplastic film. The recording layers of the invention have low surface tension compared with previously known products and can provide fine and deep wrinkles even when the charge density of the surface is relatively low. A further and unexpected advantage of the invention is that airborne dust is not attracted to the recording layer.

The oils utilized in this invention are a well known class which are readily available in the marketplace. The preferred members for use in the invention will have surface tensions which are up to 25 dynes per cm, and a boiling point of at least 150° C. Such oils have been found to be particularly effective in lowering the surface tension of the recording layer so that high quality imaging is possible.

The preferred silicone oils include straight chain dimethylpolysiloxanes, methylhydrodienepolysiloxanes and methylphenylpolysiloxanes. The first mentioned oil is available, for example from Shinetsu Kagaku K.K. as KF-69. Typically useful fluorocarbon oils are available from E. D. duPont under the designation FCX. Useful chlorofluorocarbons are sold by 3M and by Osaka Kinzoku K.K. as KGL-F oil and DAIFL, respectively.

According to the present invention a recording layer having improved properties can be obtained by coating a solution containing a mixture of the selected additive and thermoplastic resin dissolved in an organic solvent such as toluene or petroleum on the selected support and drying. Any conventional coating procedure may be utilized.

The improvements of this invention are applicable to all thermoplastic resins conventionally employed for the production of thermoplastic recording materials. These include, for example, hydrogenated rosin ester, polystyrene, poly-α-methylstyrene, styrene-α-methylstyrene copolymer and styrene-acrylic ester copolymer. The preferred thermoplastic resin is hydrogenated rosin ester.

The thickness of the resin layer is normally 0.1 to 10 microns, although appreciable variation can be tolerated without adverse effects. If emphasis is on the production of relief wrinkles, the preferred thickness is from 0.1 to 5 microns.

As aforesaid, the amount of thermoplastic resin employed will normally be from 0.1 to 10% by weight. The preferred amount will vary with the thermoplastic resin selected, and the desired lowering of the surface tension. An increase above 10% does not materially increase the degree of improvement. Below 0.1% the degree of improvement is minimal.

Figure 2:
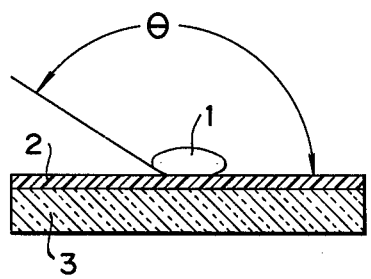

The variation of surface tension of thermoplastic resin is shown in FIG. 1, wherein hydrogenated rosin ester (sold by Hercules Powder Co. Inc. under the trademark of Staybelite Ester 10) is used as a thermoplastic resin and and silicone oil (straight chain dimethylpolysiloxane; sold by Shinetsu Kagaku Co. under the trademark of KF-69 ) is added to the thermoplastic resin. In FIG. 1, the amount (% by weight) of the additive (silicone oil) is shown as abscissa and the surface tension (represented by cos $\theta$) of the thermoplastic resin is shown as ordinate. The value of cos $\theta$ was determined as shown in FIG. 2. Referring to FIG. 2, drop of water 1 was formed on the surface of a recording layer 2 formed on a support 3. The angle of contact $\theta$ was measured and the values of cos $\theta$ was obtained. AS shown in FIG. 1, the maximum of lowering of the surface tension of the thermoplastic resin was obtained by adding the additive in an amount of 10% to the thermoplastic resin.

The following non-limiting examples are given by way of illustration only.

EXAMPLE 1

Silicone oil (straight chain dimethylpolysiloxane: KF-69 sold by Shinetsu Kagaku Co.) was added in the amount of 2% by weight to hydrogenated rosin ester (Staybelite 10), and the mixture was dissolved in organic solvent (isoparaffinic hydrocarbon: Isopar H sold by Exxon Co.) to give a solution containing 28% by weight of hydrogenated rosin ester. The solution was applied to a glass support having a conductive film of indium oxide ($In_2O_3$) and then dried to form a recording layer of thermoplastic resin film with a thickness of 1 $\mu$m on a conductive glass support. Positive corona charging was carried out in a discharge current of 4 nA/cm$^2$ for 5 seconds by means of corona generating unit, i.e. "Scorotron". (Screen-Controlled-Corona-Charging-device). A current flow was made through the conductive file of $In_2O_3$ for 0.4 second to obtain a heating value of 17 W/cm$^2$. As a result, the surface of the recording layer was deformed and frost wrinkles were obtained. Other frost wrinkles were obtained by repeating the same procedure as that shown above except that the positive corona charging was carried out for 10, 15 and 20 seconds instead of 5 seconds, respectively.

Scattering coefficients of the frost wrinkles as obtained above were determined as shown below:

$$\text{Scattering coefficient} = \frac{\text{Total energy of scattering of He-Ne laser (6328 A) where frost wrinkles were formed on a recording layer}}{\text{Energy of transmitted light of He-Ne laser (6328 A) where frost wrinkles were not formed on a recording layer}}$$

Figure 3:
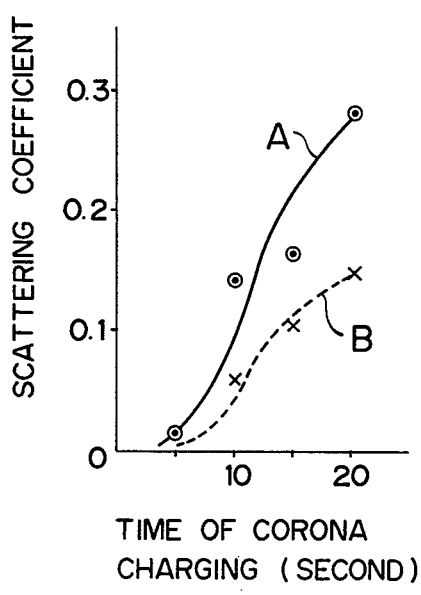

As shown in FIG. 3, Curve A (solid line) was obtained by plotting the values of the scattering coefficient as ordinate against the time of the positive corona charging.

Other thermoplastic recording members for comparison tests were obtained by repeating the same procedure as above, except that no silicone oil was employed. Frost wrinkles were obtained by carrying out the positive corona charging and the heating in the same manner as that shown above. Scattering coefficients of the frost wrinkles were determined, and Curve B (dotted line) in FIG. 3 was obtained by plotting the values thereof.

By comparing Curve A with Curve B, it is seen that deformation properties of the surface of thermoplastic recording members can be improved by adding silicone oil to thermoplastic resin.

EXAMPLE 2

This example illustrates results obtained by using thermoplastic recording members of the present invention in "holographic recording process".

A photoconductive layer of poly-N-vinylcarbazole with a thickness of 2 $\mu$m was formed on a 1.4 mm thick glass support having a conductive film of $In_2O_3$. The sheet resistance of the conductive film was 25 $\Omega$/sq. The poly-N-vinylcarbazole contained 1/16 mole of 2,4,7-trinitro-9-fluorenone as a sensitizer per monomeric unit of poly-N-vinylcarbazole. A 28% solution of Staybelite 10 in an organic solvent (Isopar H), and containing 2% by weight of silicone oil, based on the weight of Staybelite, was applied on the photoconductive layer and dried to form a recording layer of thermoplastic resin having a thickness of 0.65 $\mu$m. In this way, a thermoplastic recording member of the present invention was obtained.

The thermoplastic recording member was utilized to form a hologram by using an object having a reflectivity of 10% under the following conditions:

| | |
|---|---|
| Coherent beam | He-Ne laser (6328 A) |
| Energy of irradiation | $3 \times 10^{-7}$ W/cm$^2$ |
| Corona chargine | by Scorotron |
| Discharge current | 4 nA/cm$^2$ |
| Heating | A current flow was made through the conductive film of $In_2O_3$ for 0.4 second to obtain a heating value of 17 W/cm$^2$ |

Diffraction efficiency of the hologram was 6%.

Diffraction efficiency of a hologram was determined from the following equation:

$$\text{Diffraction effficiency} = \frac{\text{energy of light used for forming a real image}}{\text{total energy of light irradiated for forming a real image}}$$

Another hologram for use in comparison was obtained by repeating the same procedure as that described above except that a recording layer of thermoplastic resin was formed by using Staybelite 10 which was silicone oil free. Diffraction efficiency of the hologram thus obtained was 2%.

Thermoplastic recording members having recording layers of thermoplastic resin film containing silicone oil give much clearer real images compared with similar recording members containing no silicone oil.

Thermoplastic recording members of the present invention have an improved surface properties compared with previously known products.

Similar results are obtained by repeating the above examples using either fluorocarbon oil, chlorofluorocarbon oil, or both, in place of silicone oil.

We claim:

1. Thermoplastic recording member for use in recording information by deformation of a surface recording layer; said member comprising a support which is electrically conductive or photoconductive and a surface recording layer comprising a thermoplastic resin film containing from 0.1 to 10% by weight, based on the weight of the film, of at least one member selected from the group consisting of silicone oils, fluorocarbon oils and chlorofluorocarbon oils.

2. Thermoplastic recording member according to claim 1 containing from 1 to 10% by weight of oil based on the weight of the thermoplastic resin.

3. Thermoplastic recording member according to claim 1 wherein said thermoplastic resin is selected from the group consisting of hydrogenated rosin ester, polystyrene, poly-α-methylstyrene, styrene-α-methylstyrene copolymer and styrene-acrylic ester copolymer.

4. Thermoplastic recording member according to claim 1 wherein said silicone oil is one selected from the group consisting of straight chain dimethylpolysiloxanes, methylhydrodienepolysiloxanes and methylphenylpolysiloxanes.

* * * * *